FLOW SHEET FOR PRODUCTION OF GRANULAR AMMONIUM SULFATE

EFFECT OF MOLE RATIO ON SOLUBILITY
OF AMMONIUM SULFATE

United States Patent Office 3,464,809
Patented Sept. 2, 1969

3,464,809
PROCESS FOR PRODUCTION OF GRANULAR AMMONIUM SULFATE
Gordon C. Hicks, Sheffield, Ala., assignor to Tennessee Valley Authority, a corporation of the United States
Filed July 14, 1966, Ser. No. 565,212
Int. Cl. C05b *3/00;* C01c *1/24*
U.S. Cl. 71—61          3 Claims

ABSTRACT OF THE DISCLOSURE

A two-step process for the production of granular ammonium sulfate consists of (1) partial ammoniation of sulfuric acid in an open tank to prepare a hot (300° F.) solution of ammonium acid sulfate, and (2) completion of the ammoniation with concurrent granulation in a rotating drum or pugmill. Undersize particles are recycled to control granulation in the second step.

---

The invention herein described may be manufactured and used by or for the Government for governmental purposes without payment to me of any royalty thereon.

My invention relates to an improvement in the production of granular fertilizers from sulfuric acid and ammonia, together with, if desired, byproduct solutions or crystals of ammonium sulfate derived from other chemical processes, and more particularly to an improved process for the production of granular ammonium sulfate wherein the step of crystallizing from a mother liquor and extensive drying treatment of the crystals resulting therefrom is essentially eliminated.

Ammonium sulfate is effective for fertilizer use because of its favorable physical properties and because it provides an economical method for supplying nitrogen, a primary plant nutrient, in a solid form derived from ammonia—the cheapest and most economical source of fertilizer nitrogen. Greenhouses tests have shown that ammonium sulfate is an effective fertilizer and is at least comparable to ammonium nitrate as a source of nitrogen. A review of agronomic data shows that ammonium sulfate is suited for use on all types of soil. Ammonium sulfate is an excellent fertilizer for rice; therefore it is of particular interest on the world market.

Heretofore ammonium sulfate has been produced commercially from ammonia and sulfuric acid by several crystallizing processes. Such processes are described in Agricultural Chemicals 18, 54–55, 175–77, September 1963.

In addition, in U.S. Patent 2,867,523, Lutz and Marston, assigned to Dorr-Oliver Incorporated, there is disclosed a process for the preparation of granular ammonium sulfate in which it is necessary to produce a magma of fine crystals in the mother liquor of a concentrator by special conditions of evaporation. In order to increase the production of granules of the desired size in a blunger, 0.1 percent of ammonium hydroxide is added in the blunger.

In U.S. Patent 2,755,176, Pearce and Mortenson, assigned to Swift and Company, there is disclosed a process for production of granular ammonium sulfate by reaction of concentrated acid and ammonia in a T-shaped reactor fed through perforated plates and drained through a circular mixing tube into a cyclone separator. Best results are secured when the acid is not completely neutralized.

In U.S. Patent 2,856,278, U. B. Bray et al., assigned to Bray Oil Company, there is disclosed a process for production of ammonium acid sulfate or ammonium sulfate that makes partial use of the unique properties of the system $NH_3$—$H_2SO_4$—$H_2O$ in the first stage by the formation of a melt of ammonium acid sulfate containing small proportions of neutral ammonium sulfate. However, special pressure reactors were necessary for the second-stage reactor to complete the ammonia reaction to form neutral ammonium sulfate. Also, special and additional equipment was required to obtain pellets or granules.

Prior-art processes of the above-mentioned type have proven to be somewhat operative; however, such processes require the expenditure of substantial amounts of capital for such relatively expensive equipment as large pressure vessels and vacuum-producing equipment. In addition, the processes as shown in the prior art produce ammonium sulfate by the method of crystallizing the desired material from the mother liquor. This expedient of crystallizing salts from mother liquor necessitates the use of sulfuric acids of relatively high concentration, high rates of recycle in carrying out the processes, the expenditure of substantial amounts of fuel to provide heat for evaporation of water associated with the processes, and perhaps most importantly, does not allow the direct use of ammonium sulfate solutions obtained as byproducts from various chemical processes in that they contain undesirable impurities and in that their concentrations (as low as 35 percent) cannot be utilized directly in the crystallizing processes to provide substantial parts of the ammonium sulfate in the finished product.

My invention is directed to an improved process for producing granular ammonium sulfate fertilizer materials in relatively inexpensive equipment such that the step of crystallizing the desired product from a mother liquor is circumvented, thereby eliminating the necessity for pressure vessels and vacuum-producing equipment. In my process, either sulfuric acid alone, or more preferably, sulfuric acid in combination with byproduct ammonium sulfate solutions of relatively low concentration, can be utilized, and the process is adapted to the use of spent (or byproduct) sulfuric acid which is in abundant supply at a very low price. This advantage of the use of spent acid is enough alone to make the process very attractive to industry. Because of the impurities in most spent sulfuric acids, they cannot normally be used in conventional crystallization processes; however, these impurities will not affect my process. In addition, in my process, substantially lower rates of recycle are required for control of granulation, the heat of reaction is more fully utilized in the evaporation of water, the product granules have superior physical properties over the product of the prior-art processes in that the granules produced thereby have been found to have superior blending characteristics when later utilized as a constituent for the bulk blending of dry fertilizer materials, and the equipment is of conventional type already familiar to the fertilizer industry.

I have found that granular ammonium sulfate fertilizers of the type described may be produced by my process which comprises partially ammoniating sulfuric acid, either virgin or spent acid, and/or mixtures of sulfuric acid and byproduct ammonium sulfate solution, in a preneutralizer vessel to form a solution of ammonium sulfate therein; closely and carefully maintaining the $NH_3:H_2SO_4$ mole ratio in said preneutralizer vessel; maintaining the temperature in said preneutralizer vessel in a desired range; simultaneously introducing a stream of said solution of ammonium sulfate, a stream of ammoniating medium and particles of undersize product from a later-mentioned sizing step into the upper end of an inclined rotating drum; therein maintaining a bed of rolling discrete particles of ammonium sulfate; continuously introducing additional ammoniating medium beneath the surface of said bed of discrete particles of ammonium sulfate; and subsequently cooling and screening the resulting product granules.

In U.S. Letters Patent 2,729,554, Nielsson, assigned to the assignee of the present invention, there is disclosed an inclined rotating drum apparatus similar to the reaction and mixing drum apparatus which I have found to be effective in carrying out my process. Nielsson's patent describes a process for ammoniating superphosphate and is not concerned with the production of granular ammonium sulfate by the reaction between sulfuric acid and ammonia. This process of Nielsson gives good results when ammoniated superphosphate is the desired product, but it cannot be used for the production of granular ammonium sulfate in that the direct introduction of ammoniating fluid and sulfuric acid would result in the formation of extremely high temperatures from the autogenous heat of reaction so as to cause overgranulation and baking out of the product, together with high ammonia losses from the stream of ammoniating medium introduced. It would produce nothing more than a mass of unusable material from which substantially most of the nitrogen values have been lost, and not the formation of a strong granular ammonium sulfate material, as tought by my invention.

I have overcome the difficulties inherent in apparatus and processes of the type described in the prior art to a substantial extent in the present invention by eliminating the step of crystallizing material from a mother liquor in relatively expensive pressure vessels and associated vacuum-forming equipment by providing, in addition to the inclined rotating drum shown in the above-mentioned patent to Nielsson, a preneutralizing step for the formation of a solution from ammonia and sulfuric acid and a scrubbing means for recovering ammonia from offgas evolved in the rotating drum. In addition to eliminating the step of crystallizing material from a mother liquor, I have also eliminated the necessity for a dryer to be used in conjunction with the rotating drum in that the moisture content of the product leaving said drum is less than about 1.0 percent and oftentimes less than about 0.1 percent when operated according to the teachings of my invention.

Furthermore, several new advantageous features over conventional prior-art processes are realized by the present invention.

Among these advantageous features are:

(1) The equipment required by my invention is of conventional type, simple and economical.

(2) The heat of chemical reaction is utilized in the evaporation of water to the extent that drying of the product is not required when using sulfuric acid of strength as little as 60 percent $H_2SO_4$, either alone or in combination with byproduct ammonium sulfate solutions whose concentrations may range as low as 35 percent. However, of course, the sulfuric acid may contain upwards to the usual 98 percent $H_2SO_4$. Efficient utilization of this chemical heat of reaction also results in recycle requirements significantly lower than in many other granulation processes. Other processes required high-cost vacuum systems or high-fuel consumption units for the removal of water.

(3) Spent acids discarded from other chemical industries such as byproduct acids from alkalization, detergent, plastic, pesticide, and other industries and having otherwise little value can be used quite satisfactorily in my process as the impurity content and concentration of such spent acids do not have adverse effect on said process. No additional acid would be required when spent acid is used.

(4) Substantial quantities of ammonium sulfate solutions obtained as byproducts from various chemical processes can be used in concentrations as low as 35 percent to provide all or a large part of the finished ammonium sulfate.

(5) The particle size, and more importantly, the particle shape, of the product obtained has been found to be superior to the particle sizes and shapes of ammonium sulfates realized by prior-art processes when the ammonium sulfate product is later used in the bulk blending of various grades of complete fertilizer materials.

(6) By proper control of the $NH_3:H_2SO_4$ mole ratio in my preneutralizer, a very fluid solution of low moisture content (less than 10 percent water) is formed therein. The subsequent feeding of such a fluid solution with water content of 10 percent or less to the granulator allows use of low rate of recycle and helps avoid the need for drying the product. On the other hand, if the ammoniation is completed in the solution state, as in the processes of the prior art, the lower solubility thereof requires water contents of at least 30 to 40 percent for satisfactorily handling such solutions.

(7) The intense heat of reaction of the sulfuric acid and ammonia results in evaporation of large quantities of water in my preneutralizer. This chemical heat of reaction also allows the use of dilute solutions of ammonium sulfate, often available as byproduct, to supply a large part of the plant food if desired. These byproduct solutions can be used either in the acid form or as nearly neutral to neutral solutions.

(8) The partially ammoniated fluid solution (with high solubility of ammonium sulfate at the preferred mole ratio) coats evenly on the recycle material to form well-shaped, hard granules. Thus, the usual troublesome formation of large amounts of very small particles and dust, as is found in carrying out the processes of the prior art, is avoided.

(9) The completion of ammoniation in the granulation drum provides intense heat of reaction (with temperatures of 300–400° F., and higher) so as to thoroughly dry the product granules. Therefore, only cooling and screening are required following my granulation step. This, of course, allows a simple process with a minimum of equipment and steps required for the carrying out of same.

It is therefore an object of the present invention to provide an improved process for producing granular fertilizers from sulfuric acid and ammonia.

Another object of the present invention is to provide an improved process for the production of granular ammonium sulfate fertilizers whereby a high degree of ammoniation of sulfuric acid is attained in a manner whereby large amounts of water are not contained in the fully ammoniated material, thereby eliminating (1) the necessity for drying the finished product, and (2) the use of high rates of recycle.

Still another object of the present invention is to provide an improved process for the production of granular ammonium sulfate fertilizers whereby a high degree of ammoniation o fsulfuric acid is attained in a manner whereby large amounts of water are not contained in the fully ammoniated material, thereby eliminating the necessity for drying of the finished product and the use of high rates of recycle, and whereby substantial portions of the product obtained therefrom are "onsize" and only minor proportions are large oversize particles or fines.

Still further and more general objects and advantages of the present invention will appear from the more detailed description set forth below, it being understood, however, that this more detailed description is given by way of illustration and explanation only, and not by way of limitation since various changes therein may be made by those skilled in the art without departing from the spirit and scope of the present invention.

In carrying out the objects of my invention in one form thereof, I employ a rotating drum apparatus which is similar in design to that shown in the above-mentioned Nielsson patent. I have found it most economical to employ this type of equipment for continuous mixing operations. In addition, I have discovered that if I employ a preneutralizer vessel for partial preneutralization of sulfuric acid with ammonia to form a solution of ammonium sulfate containing less than about 10 percent water, and at the same time carefully control the $NH_3:H_2SO_4$ mole ratio in said preneutralizer vessel prior to the introduction of the material into the rotating drum, a granular product having highly desirable physical and chemical characteristics may be withdrawn from the lower end of the drum without any need for the subsequent drying thereof.

As has been stated in my discussion of the prior art, ammonium sulfate is difficult to produce in granular form. Granulation by the usual techniques of the prior art results in mostly fine material and large oversize particles with insufficient proportions of the desired product-size granules. Further, fully ammoniated solutions of ammonium sulfate must contain a large amount of water (30 to 40 percent) to avoid copious salting out of the ammonium sulfate. I have now found that by proper control of the $NH_3:H_2SO_4$ mole ratio in the preneutralizer vessel, a very fluid solution with 10 percent or less of water can be handled satisfactorily and subsequently sprayed into the ammoniator-granulator for completion of the reaction. The coating of the partially ammoniated fluid solution on the recycled undersize and simultaneous completion of the ammoniation yields well-shaped durable granules with good granulation efficiency. Further, in my invention the intense heat of reaction in the ammoniator-granulator drum produces dry product granules that require only cooling and screening to complete the process. The process of my invention is adapted to the use of both sulfuric acid and ammonia, or combinations of these feed materials with byproduct solutions or crystals of ammonium sulfate. Also, the process is adapted to the use of impure forms of sulfuric acid which is discarded from other chemical processes as spent acid.

My invention, together with further objects and advantages thereof, will be better understood from a consideration of the following description taken in connection with the accompanying drawings in which.

Figure 1:
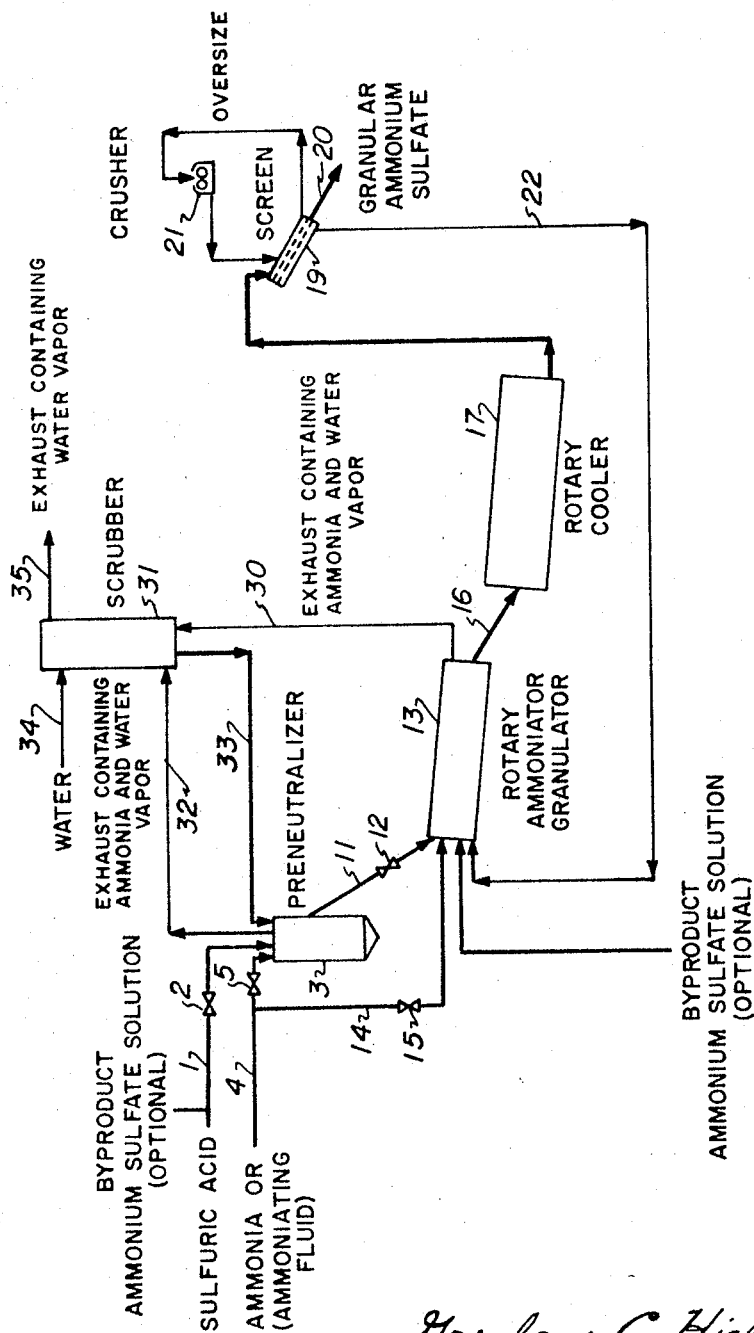
FIGURE 1 is a flowsheet generally illustrating principles of my novel process which result in a granular ammonium sulfate fertilizer material having the properties mentioned above.

Referring now more specifically to FIGURE 1, it may be seen that the flow diagram and equipment used therein are similar to that for the process disclosed in U.S. Patent 3,153,574, Achorn et al., assigned to the assignee of the present invention, for the production of diammonium phosphate. There are, however, significant differences in the process of Achorn and that of my invention. My invention uses sulfuric acid instead of phosphoric acid to fix the ammonia supplying the nitrogen in the fertilizer. In my process the ammonia-to-acid mole ratio in the preneutralizer does not affect the loss of ammonia from that vessel as it does in the Achorn process because the vapor pressure of ammonia over the solution, in my process, is insignificant in the range of operation. On the other hand, the $NH_3:H_2SO_4$ mole ratio in the preneutralizer vessel, in my process, is very critical as to its effect on the fluidity of the solution and the resulting water content thereof. In addition, by careful control of said mole ratio in my invention the fluid produced in the preneutralizer is a solution easy to feed and contains substantially no undissolved solids, as is the case of the diammonium phosphate process of Achorn. Such solution, which contains 10 percent or less of water, can be utilized according to the teachings of my process in that I have incorporated the unique solubility of the system $NH_3$—$H_2SO_4$—$H_2O$ into the steps and conditions of operating the steps therein.

Further, my process produces a granular material which is essentially "bone dry" without the need or use of a subsequent drying step, as is called for in the Achorn process. In my invention, the solution of ammonium sulfate containing less than about 10 percent water is applied to the surface of nuclei such as the recycled fines and is dried immediately by the chemical heat of ammoniation before the moisture can penetrate the granule. The chemical heat derived from the reaction of ammonia and sulfuric acid is about 30 percent greater than that from the reaction with phosphoric acid. This additional chemical heat is utilized effectively in my process wherein I can incorporate the use of byproduct crystals or byproduct solution of ammonium sulfate such as those produced in the steel industry and other industries. Furthermore, in the process of my invention, spent acid discarded from other chemical processes can be used as one of the major required materials, whereas, the process disclosed in U.S. Patent 3,153,574 requires the use of phosphoric acid which is made solely for the purpose of manufacturing the diammonium phosphate.

Referring now to flowsheet, sulfuric acid from a source not shown is fed through line 1 and any suitable means for control or rate of flow 2 into preneutralizer vessel 3. Simultaneously, ammonia from a source not shown is fed via line 4 and means for control of flow 5 into preneutralizer vessel 3, whereby a solution of ammonium acid sulfate is formed therein. The mole ratio of $NH_3:H_2SO_4$ in preneutralizer vessel 3 is maintained in the range from about 0.9 to about 1.5, and preferably at about 1.1. The temperature in preneutralizer vessel 3 is maintained in the range from about 250° F. to about 400° F., and preferably about 310° F. to 330° F. A portion of the resulting solution of ammonium acid sulfate from preneutralizer vessel 3 is fed via line 11 and means for control of flow 12 into rotary ammoniator-granulator 13. Simultaneously, additional ammoniating medium is fed via line 14 and means for control of flow 15 into ammoniator-granulator 13, together with particles of recycled fines or undersize product from a later-mentioned sizing step into ammoniator-granulator 13. The resulting granulated and dried ammonium sulfate material from ammoniator-granulator 13 is fed via line 16 to cooler 17, from which it passes via line 18 to screening means generally illustrated at 19, wherefrom the granular ammonium sulfate onsize product is withdrawn via line 20. The remaining oversize material is crushed in a conventional type crusher 21 and returned to screening means 19, wherefrom it, together with fines, is recycled via line 22 back to ammoniator-granulator 13. The exhaust containing ammonia and water vapor from ammoniator-granulator 13 is led from the granulator via line 30 to a scrubber generally illustrated as scrubbing means 31. In addition, the exhaust from preneutralizer 3 containing acid mist and water vapor is fed to scrubbing means 31 via line 32. The ammonia and acid recovered in scrubbing means 31 is returned to preneutralizer vessel 3 via line 33. In order to control and keep the temperature in preneutralizer vessel 3 within the desired range, quantities of water must be added thereto. I have shown such quantities of water ultimately added to preneutralizer 3 from a source not shown fed via line 34 to scrubbing means 31, wherefrom it, together with recovered ammonia and acid, is returned to preneutralizer 3 via line 33. The exhaust gases containing excess water vapor are vented to the atmosphere via line 35 from scrubbing means 31.

In operating the process of my invention in the preferred embodiment shown in FIGURE 1, I have found that close control of the $NH_3:H_2SO_4$ mole ratio in the preneutralizer in the range of about 0.9 to 1.5 allows the production of a clear solution of ammonium sulfate of low moisture content which exhibits a low loss of ammonia and acid mist, which is satisfactory fluid for feeding by gravity into the ammoniator-granulator, and which contains less than about 10 percent water. When the mole ratio is so maintained in this range, the chemical heat of reaction operates efficiently to evaporate a large part of the water from the system and allows the formation of a liquid solution of high ammonium sulfate solubility having a low water content for subsequent coating on nuclei in ammoniator-granulator 13. In the most preferred embodiment of my invention, I maintain the $NH_3:H_2SO_4$ mole ratio in preneutralizer 3 at about 1.1 to make use of the invariant point in the solubility diagram of the system ammonia-sulfuric acid-water.

On the other hand, I have found that if the mole ratio of ammonia to sulfuric acid in preneutralizer 3 is not maintained in the desired range, the solubility of the ammonium sulfate solution produced therein at mole ratios higher than about 1.5 is greatly decreased such that substantial amounts of water would be required therein to prevent the copious salting out of ammonium sulfate crystals, thereby yielding a product not having the desired characteristics and a process not meeting the objectives of my invention. On the other hand, if the mole ratio in the preneutralizer is less than about 0.9 the solution is too acid and excessive corrosion problems occur.

It will be obvious from the above discussion that the equipment utilized in my process is simple and of conventional type and, in addition, all operations of the process are at atmospheric pressure, thus avoiding the use of expensive vacuum or pressure equipment.

Figure 2:
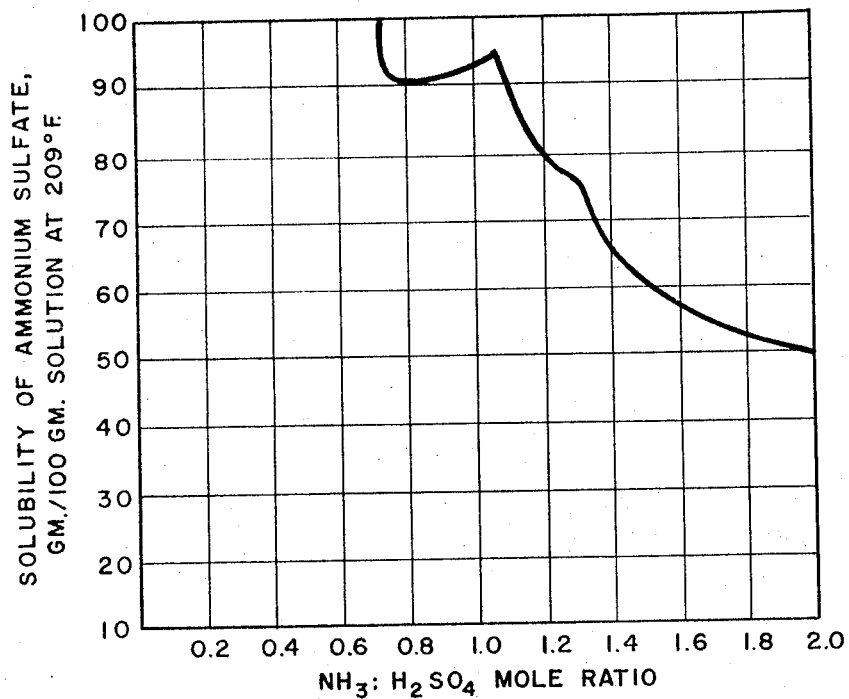
FIGURE 2 is a graphical illustration showing the unique solubility of the system $NH_3$—$H_2SO_4$—$H_2O$ wherefrom the unique properties of the system $NH_3$—$H_2SO_4$—$H_2O$ and the unique details of my operating technique yields a process whereby the objectives of my invention may be realized.

Referring now more specifically to FIGURE 2, there is shown the effect of the mole ratio on the solubility of ammonium sulfate in the system ammonium sulfate-sulfuric acid-water. As may be seen in the most preferred embodiments of my invention, when the mole ratio $NH_3:H_2SO_4$ of about 1.1 is used in the preneutralizer, I can take advantage of the invariant point of highest solubility for the system, which is shown in the figure. It should be noted that the curve plotted in FIGURE 2 was determined under conditions of constant temperature at about 210° F. Accordingly, if my process were operated at this temperature in the preneutralizer vessel, I would be restricted to an operating mole ratio from about slightly less than 0.9 to slightly greater than about 1.1 in order to operate this step in the preneutralizer vessel to ensure that the material diverted therefrom to the ammoniator-granulator was in fact a liquid solution substantially free of fine crystals of ammonium sulfate and at the same time contained less than about 10 percent water. It has now been found, however, that in operating the preneutralizer under the conditions indicated supra, specifically the temperature ranges upwards to about 400° F., this portion of the graph wherein there is produced a solution free of ammonium sulfate crystals is sufficiently shifted up the vertical ordinate so as in effect to allow the use of a mole ratio $NH_3:SO_4$ upwards to about 1.5 and still obtain from the preneutralizer vessel a solution of ammonium sulfate free of ammonium sulfate crystals and containing less than about 10 percent water. Therefore, I can operate my process in the broader embodiments thereof on either side of the point of highest solubility such that the objectives of my invention may be substantially realized when the mole ratio of $NH_3:H_2SO_4$ in the preneutralizer vessel is maintained in the range from about 0.9 to about 1.5.

In order that those skilled in the art may better understand how the present invention can be practiced, the following examples of processes which I have used in the steps of producing granular ammonium sulfate fertilizer materials having the desired superior physical and chemical characteristics described are given by way of illustration and not by way of limitation.

Example I

In my earliest work, exploratory tests were made in the granulation pilot plant to determine the feasibility of producing granular ammonium sulfate in equipment similar to that used for production of granular diammonium phosphate. This process should be adaptable to granulation of ammonium sulfate crystals or direct production of granular ammonium sulfate from sulfuric acid and ammonia. Segments of the fertilizer industry have shown considerable interest in such a process. In the current tests, direct production of granular ammonium sulfate was studied by partially ammoniating sulfuric acid (93 percent $H_2SO_4$) in the preneutralizer to an $NH_3:H_2SO_4$ mole ratio of about 1.1 and completing the ammoniation and simultaneously granulating the product in the ammoniator-granulator. An $NH_3:H_2SO_4$ mole ratio of 1.1 was used in the preneutralizer to take advantage of a point of high solubility for the system $NH_3$—$H_2SO_4$—$H_2O$ which is shown in FIGURE 1 for about 210° F. The temperature in the preneutralizer was held at about 310° F. by the addition of water; this is approximately the boiling point of the 1.1 mole ratio solution containing about 10 percent water.

The solution from the preneutralizer was fed to the ammoniator-granulator by gravity and discharged through an open end pipe. Pumping of the solution was not attempted. The remainder of the ammonia required was introduced beneath the rolling bed. Granulation was controlled by the rate of addition of recycled fines. The granular material was only cooled after leaving the ammoniator-granulator. The cooled material was sized on 6- and 10-mesh screens. Production rate was limited to 0.3 ton per hour by the high rate of evaporation of water in the preneutralizer. Data from these tests are given in Tables I and II below. In test A–1 only the preneutralizer was operated.

When about 55 percent of the ammonia was added to the preneutralizer to give a mole ratio of about 1.1, the temperature in the preneutralizer rose rapidly and about 830 pounds of water per ton of product was required to hold the temperature between 310° and 320° F. The water content of the boiling solution was about 10 percent and the pH was about 0.6. At these conditions the solution was very fluid. The viscosity was measured at several temperatures and found to be about 60 centipoises. However, only a slight increase in ammonia resulted in a slurry that was too viscous to flow, pointing out the importance of correct adjustment of the mole ratio to obtain good fluidity. The change in pH resulting from a change in $NH_3:H_2SO_4$ mole ratio is too small to use pH as a satisfactory means of controlling the mole ratio unless an expanded scale is available for the pH meter. In this particular series of tests, loss of ammonia from the preneutralizer was not measured but would be expected to be low because of the low pH.

TABLE I.—DATA FROM OPERATION OF THE PRENEUTRALIZER IN PILOT-PLANT TESTS OF PRODUCTION OF GRANULAR AMMONIUM SULFATE

| Test No. | A-1 | | | | A-2 | | | A-3 | |
|---|---|---|---|---|---|---|---|---|---|
| Feed rates, lb./ton: | | | | | | | | | |
| Ammonia gas | 296 | | | | 306 | | | 320 | |
| Sulfuric acid (93% $H_2SO_4$) | 1,580 | | | | 1,580 | | | 1,580 | |
| Time after start of test time, min | 38 | 75 | 110 | 148 | 203 | 300 | 330 | 200 | 223 |
| Temperature, °F | 250 | 322 | 306 | 306 | 308 | 310 | 308 | 314 | 306 |
| pH | 0.75 | 0.6 | 0.6 | 0.5 | 0.7 | 0.5 | 0.5 | 0.45 | 0.5 |
| Water fed, lb./ton | | | 746 | 746 | 763 | 802 | 802 | 740 | 808 |
| Equivalent acid concentration, percent $H_2SO_4$ | | | 66.4 | 66.4 | 66.4 | 65.3 | 65.3 | 66.4 | 64.4 |
| Chemical composition, percent: | | | | | | | | | |
| $NH_3$ | 13.49 | 15.65 | 14.35 | 14.29 | 15.97 | 14.13 | 14.00 | 12.85 | 14.30 |
| $H_2SO_4$ | 62.71 | 75.77 | 75.78 | 75.46 | 74.92 | 76.23 | 76.16 | 76.93 | 76.45 |
| $H_2O$ (by difference) | 23.80 | 8.58 | 9.87 | 10.25 | 9.11 | 9.64 | 9.84 | 10.22 | 9.25 |
| Mole ratio, $N:SO_3$ | 1.24 | 1.19 | 1.09 | 1.09 | 1.23 | 1.07 | 1.06 | 0.96 | 1.08 |
| Viscosity, cp | 28 | 62 | 55 | 55 | | | | | |

TABLE II.—DATA FROM OPERATION OF SOLIDS SYSTEM IN PILOT-PLANT TESTS OF PRODUCTION OF GRANULAR AMMONIUM SULFATE

| Test No. | A-2 | A-3 |
|---|---|---|
| Ammonia feed to granulator, lb./ton | 256 | 278 |
| Ammoniator-granulator product: | | |
| Temp., °F | 315-330 | 310 |
| Water content, percent | 0.1 | 0.1 |
| Ammonia loss, percent | 0.2 | 0.6-2.3 |
| Screen analysis, percent: | | |
| +6 mesh | 12.6 | 12.5 |
| −6 +8 mesh | 2.4 | 3.9 |
| −8 +10 mesh | 9.3 | 14.1 |
| −10 +12 mesh | 11.9 | 18.8 |
| −12 +16 mesh | 26.1 | 26.9 |
| −16 +28 mesh | 26.0 | 16.1 |
| −28 mesh | 11.7 | 7.7 |
| Recycled fines: | | |
| Chemical composition, percent: | | |
| N | 19.9 | 19.0 |
| $SO_3$ | 60.3 | 60.7 |
| $H_2O$ | 0.1 | 0.1 |
| $NH_3:H_2SO_4$ mole ratio | 1.89 | 1.79 |
| pH by meter | 2.1 | 1.8 |
| Screen analysis: | | |
| +6 mesh | 0.0 | 0.0 |
| −6 +8 mesh | 0.0 | 0.0 |
| −8 +10 mesh | 0.6 | 1.0 |
| −10 +12 mesh | 12.0 | 16.5 |
| −12 +16 mesh | 38.6 | 38.9 |
| −16 +28 mesh | 42.4 | 32.3 |
| −28 mesh | 6.4 | 11.3 |
| Onsize product: | | |
| Chemical composition, percent: | | |
| N | 19.4 | 18.7 |
| $SO_3$ | 60.5 | 61.5 |
| $H_2O_4$ | 0.1 | 0.1 |
| $NH_3:H_2SO_4$ mole ratio | 1.82 | 1.77 |
| pH | 1.9 | 1.8 |
| Screen analysis: | | |
| +6 mesh | 0.1 | 0.1 |
| −6 +8 mesh | 17.7 | 16.7 |
| −8 +10 mesh | 64.4 | 68.9 |
| −10 +12 mesh | 17.4 | 13.8 |
| −12 mesh | 0.4 | 0.5 |

Granulation was satisfactory with a recycle ratio of about 2.5 pounds per pound of product. The heat of reaction raised the temperature of the material in the ammoniator-granulator to about 310° F. The $NH_3:H_2SO_4$ mole ratio of the granules was only 1.7 to 1.9 because insufficient ammonia was added. The loss of ammonia was 0.3 to 2 percent of the total ammonia fed. In test A-2 a small amount of heat was added in the dryer. In test A-3 the dryer was used only as a conveyor and the product was cooled without drying. The moisture content of the products was less than 0.1 percent in each case. Drying would not be required.

Corrosion specimens of several metal alloys were placed in the preneutralizer during the current tests to measure the corrosion rates under operating conditions. Corrosion rates for all alloys were excessively high as shown by the data tabulated below.

| Alloy tested | Corrosion rate, mils/year | |
|---|---|---|
| | 2.8-hour test (A-1) | 9.4-hour test (A-2 and A-3) |
| A.I.S.I. stainless steel: | | |
| Type 304 welded with Type 316 [1] | 260 | 1,262 |
| Type 316 welded with Type 316 [1] | 755 | 1,606 |
| Incoloy 825 welded with Incoloy 825 [1] | 109 | 417 |
| Carpenter 20-Cb3 | 178 | 749 |
| Worthite | 187 | 945 |
| Monel welded with No. 140: | | |
| Monel rod [2] | 459 | [3] 206 |
| Incoloy | 1,395 | 2,338 |

[1] Welded by electric-arc method and cooled in still air.
[2] Welded by oxyacetylene method and cooled in still air.
[3] The specimen of Monel had a tightly adhering protective coating.

These data indicate that metals alone probably would not be suitable for construction of the preneutralizer. A preneutralizer with a lining of acid-resistant brick probably would be satisfactory for this application. This type of construction is, of course, quite common and would not add significantly to the cost of the equipment. Corrosion tests were, of course, not required in the granulator since the conditions of pH therein are such as not to adversely affect common materials normally used in its construction.

The product granules were well shaped and hard. Preliminary bag storage tests with and without conditioner indicated the material to have good storage characteristics.

Example II

Further tests were made in the granulation pilot plant under somewhat similar conditions to those in Example I.

In this test, studies were made of the use of solutions of byproduct ammonium sulfate to supply a major proportion of the product. The chemical heat and liquid phase needed to form granules of high strength were supplied by the reaction of ammonia and sulfuric acid. The $NH_3:H_2SO_4$ mole ratio in the preneutralizer was maintained at about 1.3 by adjustment of the feed of ammonia, sulfuric acid (98% $H_2SO_4$), and byproduct solution of ammonium sulfate. The temperature in the preneutralizer was 300° F.

The solution from the preneutralizer was fed to the ammoniator-granulator where the remainder of the ammonia and additional byproduct ammonium sulfate were fed. Granulation was controlled by the rate of recycling of undersize material. The granular material was cooled and then sized on 6- and 10-mesh screens. Data from this test are given in Table III below.

All of the sulfuric acid and about 20 percent of the ammonia were added to the preneutralizer. About 70 percent of the product was derived from byproduct ammonium sulfate. Over half of the byproduct ammonium sulfate was fed to the preneutralizer to control the temperature of the solution. The use of sulfuric acid containing 98 percent $H_2SO_4$ increased the proportion of byproduct sulfate that could be used.

Granulation was satisfactory with a recycle ratio of about 1.3 pounds per pound of product. The heat of reaction was sufficient to evaporate nearly all of the water introduced so that the product did not need drying.

TABLE III.—DATA FROM PILOT-PLANT TESTS OF PRODUCTION OF GRANULAR AMMONIUM SULFATE

Preneutralizer conditions:
  Feed rates (anhydrous basis) lb./ton:
    Ammonia gas _____ 34
    Sulfuric acid _____ 441
    Byproduct ammonium sulfate ____ 726
  Solution:
    Temperature, °F. _____ 300
    pH _____ 0.8

TABLE III—Continued

Chemical composition, percent:
- $NH_3$ _____ 16.8
- $H_2SO_4$ _____ 75.7
- $H_2O$ _____ 7.5
- Mole ratio, $N:SO_3$ _____ 1.28

Ammoniator-granulator conditions:
Feed rates (anhydrous basis) lb./ton:
- Ammonia _____ 125
- Byproduct ammonium sulfate _____ 660
- Preneutralizer solution _____ 1201
- Recycle _____ 2512

Ammoniator-granulator product:
- Temperature, °F. _____ 240
- Water content, percent _____ 0.2
- Ammonia loss _____ 5.3

Screen analysis, percent:
- +6 mesh _____ 8.4
- −6+10 mesh _____ 24.2
- −10+12 mesh _____ 27.6
- −12+16 mesh _____ 29.6
- −16 mesh _____ 10.2

Onsize product

Chemical composition, percent:
- N _____ 20.5
- $SO_3$ _____ 60.0
- $H_2O$ _____ 0.1
- Mole ratio $N:SO_3$ _____ 1.95
- pH _____ 3.8

Screen analysis, percent:
- +6 mesh _____ 0.2
- −6+8 mesh _____ 19.1
- −8+10 mesh _____ 66.3
- −10+12 mesh _____ 13.7
- −12 mesh _____ 0.7

What I claim as new and desire to secure by Letters Patent of the United States is:

1. A process for the production of granular ammonium sulfate fertilizer material which comprises continuously ammoniating sulfuric acid containing about 60 to about 98 percent $H_2SO_4$ in a preneutralizer vessel to form a solution of ammonium sulfate therein resulting from the ammoniation of said sulfuric acid; cooling said resulting solution of ammonium sulfate is said preneutralizer vessel to the range from about 250° F. to about 400° F. by adding water thereto; adjusting the relative amounts of sulfuric acid and ammonia added to said preneutralizer to maintain the $NH_3:H_2SO_4$ mole ratio in said preneutralizer vessel in the range from about 0.9 to about 1.5 for effecting the concentration of the resulting ammonium sulfate solution in said preneutralizer vessel at greater than about 90 grams of ammonium sulfate per hundred grams of solution; introducing a stream of said ammonium sulfate solution from said preneutralizer vessel, together with a stream of ammoniating fluid and particles of undersize product from a later-mentioned sizing step into the upper end of an inclined rotating drum; therein maintaining a bed of rolling discrete particles of ammonium sulfate; recovering the ammonia evolved in said rotating drum by passing the offgas therefrom through scrubbing means; returning the recovered ammonia from said scrubbing means to said preneutralizer vessel; withdrawing granular dry amomnium sulfate material from the lower end of said rotating drum; introducing said withdrawn dry material into sizing means; returning particles of predetermined size from said sizing means into the upper end of said drum; and withdrawing from said sizing means granular particles of ammonium sulfate as product, said process being characterized by the fact that substantially all of the heat necessary to evaporate the necessary amount of water from the system for producing said granular dry product is supplied by the chemical heat of reaction of the reactants, thereby substantially eliminating the necessity of supplying any external heat to the system comprising said process, including eliminating the necessity of supplying any external heat to the product leaving the lower end of said rotating drum for the purpose of further drying thereof.

2. The process of claim 1 wherein the $NH_3:H_2SO_4$ mole ratio in said preneutralizer vessel is adjusted in the range from about 0.9 to about 1.1 thereby effecting the concentration of the ammonium sulfate solution resulting in said preneutralizer vessel in the range from about 90 to about 95 grams of ammonium salt per 100 grams of solution, and wherein sufficient water is added to said preneutralizer vessel to adjust the temperature therein in the range from about 310° F. to about 330° F.

3. The process of claim 1 wherein the $NH_3:H_2SO_4$ mole ratio in said preneutralizer vessel is about 1.1 thereby effecting the concentration of the ammonium sulfate solution resulting in said preneutralizer vessel in the range from about 90 to about 95 grams of ammonium salt per 100 grams of solution, and wherein sufficient water is added to said preneutralizer vessel to adjust the temperature therein in the range from about 310° F. to about 330° F.

References Cited

UNITED STATES PATENTS 2,047,393  7/1936  Siems.
3,351,455  11/1967  Burns _____ 71—61

S. LEON BASHORE, Primary Examiner

R. D. BAJEFSKY, Assistant Examiner

U.S. Cl. X.R.
71—64, 63; 23—119